(12) United States Patent
Prasanna

(10) Patent No.: US 6,219,390 B1
(45) Date of Patent: Apr. 17, 2001

(54) ADAPTIVE INTERFERENCE CANCELLER USING DIGITAL CONTROL TECHNIQUES

(75) Inventor: G. N. Srinivasa Prasanna, Clinton, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/063,919

(22) Filed: Apr. 21, 1998

(51) Int. Cl.[7] .............................. H03D 1/04; H04B 1/10; H04M 9/08
(52) U.S. Cl. .......................... 375/346; 455/296; 379/410
(58) Field of Search .................... 375/346, 348, 375/256; 455/296, 303, 306, 307; 381/94.1; 379/410; 342/92

(56) References Cited

U.S. PATENT DOCUMENTS

| | | | |
|---|---|---|---|
| 5,235,612 | * | 8/1993 | Stilwell et al. . |
| 5,410,750 | * | 4/1995 | Cantwell et al. ................ 455/306 |
| 5,537,443 | * | 7/1996 | Yoshino et al. ................ 375/340 |
| 5,761,237 | * | 6/1998 | Petersen et al. ................ 375/200 |
| 5,894,500 | * | 4/1999 | Bruckert et al. ................ 375/346 |

* cited by examiner

Primary Examiner—Chi Pham
Assistant Examiner—Khai Tran

(57) ABSTRACT

An adaptive interference canceller employing digital synthesis techniques and a digital to analog converter for eliminating narrow band RFI.

20 Claims, 1 Drawing Sheet

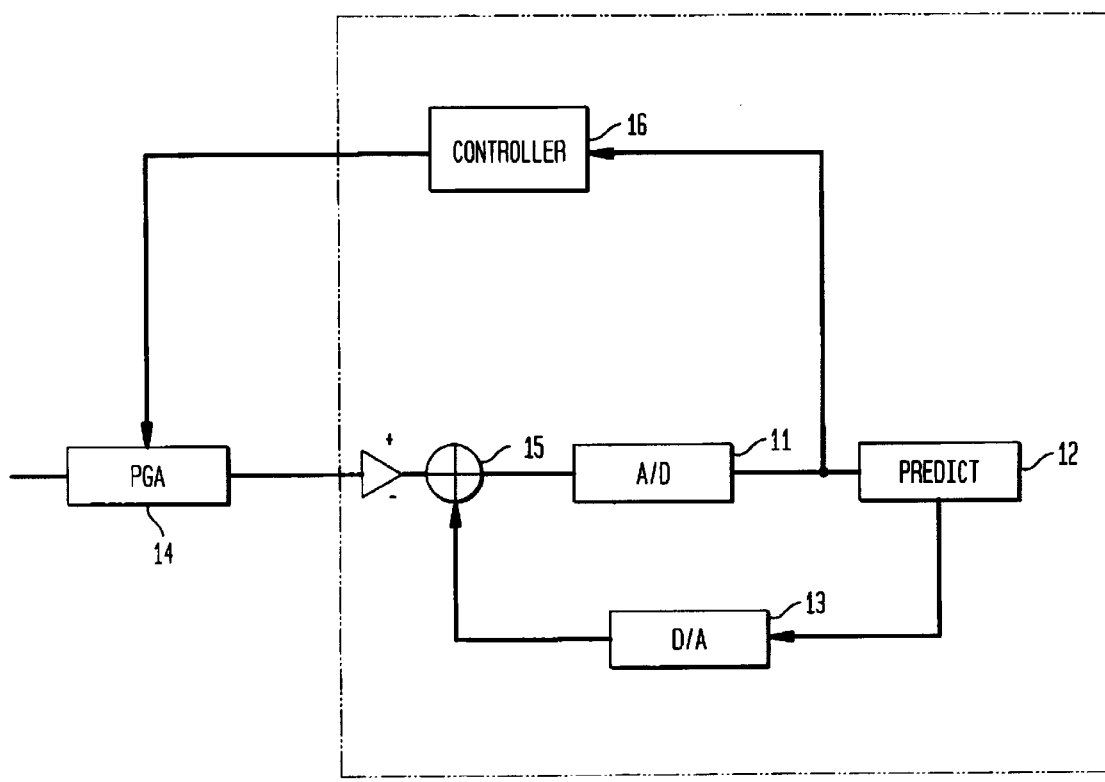

ADAPTIVE INTERFERENCE CANCELLER USING DIGITAL CONTROL TECHNIQUES

THE FIELD OF THE INVENTION

The present invention is directed generally towards interference cancellers, and more particularly towards an interference canceller which uses digital synthesis techniques to eliminate narrow band radio frequency interference (RFI).

BACKGROUND OF THE INVENTION

Conventional narrow band RFI cancellers such as line-interference cancellers eliminate the RFI present in a signal in order to improve the clarity and strength of the signal. Such devices are well known in the art and employ analog techniques to analyze the spectrum of a signal, estimate the level of RFI present in the signal, and then subtract this estimated RFI from the signal.

Such devices are used, for example, as part of communications receivers to eliminate the narrow band RFI generated by power lines. These conventional devices, however, suffer from a significant drawback in that the amount of RFI which can be eliminated is limited. Accordingly, there is a need for a device which can eliminate greater amounts of RFI. Therefore, it would be desirable to provide a canceller which can overcome the drawback of conventional cancellers by employing digital synthesis techniques to eliminate narrow band RFI.

SUMMARY OF THE INVENTION

In accordance with the present invention there is provided an adaptive RFI canceller using digital synthesis and a digital to analog converter for eliminating narrow band RFI.

BRIEF DESCRIPTION OF THE DRAWINGS

A more complete understanding of the present invention may be obtained from consideration of the following description in conjunction with the drawing in which:

FIG. 1 shows an exemplary embodiment of an adaptive RFI canceller using digital control techniques according to this invention.

DETAILED DESCRIPTION OF THE INVENTION

Referring to FIG. 1 there is shown an exemplary embodiment of an adaptive RFI canceller 10 using digital control techniques according to this invention. Analog to digital converter (A/D) 11 converts an analog signal from programmable gain amplifier (PGA) 14 into a digital signal. RFI predictor 12, analyzes the spectrum of this digital signal using Fast Fourier Transforms, or other similar mathematical methods, to determine the level of RFI present therein. RFI predictor 12 then digitally synthesizes this signal using linear predictive coding, or other similar techniques, to replicate the undesired RFI. RFI predictor 12 is preferably implemented as a filter driven by an adaptive algorithm.

D/A 13 converts the synthesized digital signal into an analog signal which subtractor 15 subtracts from the amplified signal output by PGA 14. Cancelling the RFI before A/D conversion in this manner prevents A/D overload. Although a large attenuation is initially used in PGA 14 to accommodate the RFI, as greater amounts of RFI are cancelled by canceller 10, controller 16 is able to increase the gain of PGA 14, thereby improving its input resolution. This cancellation need not be exact, but only sufficient to reduce the dynamic range of the amplified signal output from PGA 14. Accordingly, canceller 10 need not eliminate all of the RFI. In an alternative embodiment, controller 16 can be coupled to predictor 12.

Changes in the frequency, amplitude or phase of the RFI input are detected by RFI predictor 12. Determining the amount of RFI present and synthesizing a signal to replicate the undesired RFI by employing digital techniques, rather than by employing analog techniques as is conventionally done, improves the amount of RFI which can be eliminated from the amplified signal output from PGA 14. Canceller 10 is able to eliminate between 6 to 12 dB of RFI.

Numerous modifications to and alternative embodiments of the present invention will be apparent to those skilled to the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claims is reserved.

What is claimed is:

1. An adaptive interference canceller for eliminating narrow band radio frequency interference from a signal, comprising:
    a device for digitally determining the amount of narrow band radio frequency interference present in a signal and then synthesizing a replica of said narrow band radio frequency interference said signal being output by a programmable gain amplifier; and
    a device for subtracting said replicated narrow band radio frequency interference from said signal to eliminate said narrow band radio frequency interference.

2. The adaptive interference canceller according to claim 1, wherein said device for determining the amount of narrow band radio frequency interference present in said signal and then synthesizing a replica of said narrow band radio frequency interference determines said amount of radio frequency interference present by employing Fast Fourier Transforms.

3. The adaptive interference canceller according to claim 1, wherein said device for determining the amount of narrow band radio frequency interference present in said signal and then synthesizing a replica of said narrow band radio frequency interference synthesizes said replica by employing linear predictive coding.

4. The adaptive interference canceller according to claim 1, wherein said adaptive interference canceller further includes a digital to analog converter for converting said replicated narrow band radio frequency interference into an analog signal such that said interference can be cancelled in the analog domain.

5. The adaptive interference canceller according to claim 1, wherein said canceller further includes an analog to digital converter for converting said signal output by said programmable gain amplifier into a digital signal.

6. The adaptive interference canceller according to claim 1, wherein said canceller further includes a controller for controlling the gain of said programmable gain amplifier, said controller being configured for increasing the gain as said radio frequency interference is cancelled.

7. The adaptive interference canceller according to claim 1, wherein the cancellation of said radio frequency interference reduces the dynamic range of said signal output by said programmable gain amplifier.

8. The adaptive interference canceller according to claim 1, wherein said canceller is employed as a component in a communications receiver.

9. The adaptive interference canceller according to claim 1, wherein said device for determining the amount of narrow band radio frequency interference present in a signal and then synthesizing a replica of said narrow band radio frequency interference is a filter.

10. The adaptive interference canceller according to claim 1, wherein said canceller eliminates between 6 to 12 dB of said radio frequency interference.

11. An adaptive interference canceller for eliminating narrow band radio frequency interference from an analog signal, comprising:

an analog to digital converter for converting said analog signal into a digital signal;

a device for digitally determining the amount of narrow band radio frequency interference present in said analog signal and then synthesizing a replica of said narrow band radio frequency interference;

a digital to analog converter for converting said replicated narrow band radio frequency interference into a second analog signal;

a device for subtracting said second analog signal from said analog signal to eliminate said narrow band radio frequency interference; and a controller for controlling the gain of said analog signal.

12. The adaptive interference canceller according to claim 11, wherein said device for determining the amount of narrow band radio frequency interference present in said analog signal and then synthesizing a replica of said narrow band radio frequency interference determines said amount of radio frequency interference present by employing Fast Fourier Transforms.

13. The adaptive interference canceller according to claim 11, wherein said device for determining the amount of narrow band radio frequency interference present in said analog signal and then synthesizing a replica of said narrow band radio frequency interference synthesizes said replica by employing linear predictive coding.

14. The adaptive interference canceller according to claim 11, wherein said analog signal is output by a programmable gain amplifier.

15. The adaptive interference canceller according to claim 14, wherein said controller is configured for increasing the gain of said analog signal as said radio frequency interference is cancelled.

16. The adaptive interference canceller according to claim 11, wherein the cancellation of said radio frequency interference reduces the dynamic range of said analog signal.

17. The adaptive interference canceller according to claim 11, wherein said canceller is employed as a component in a communications receiver.

18. The adaptive interference canceller according to claim 11, wherein said canceller eliminates between 6 to 12 dB of said radio frequency interference.

19. An adaptive interference canceller comprising:

a subtractor adapted to receive an analog signal;

an analog to digital converter coupled to the subtractor;

a predictor coupled to the analog to digital converter and adapted to produce a replica signal of narrow band radio interference in a digital signal; and a digital to analog converter coupled to the predictor to receive the replica signal, the digital to analog converter also being coupled to the subtractor.

20. A method of eliminating narrow band radio frequency interference in a signal, comprising the steps of:

digitally analyzing a signal to determine the level of radio frequency interference present therein said signal being output by a programmable gain amplifier;

digitally synthesizing a replica of said radio frequency interference; and subtracting said replica of said radio frequency interference from said signal.

* * * * *